United States Patent
Janitzki

Patent Number: 5,944,465
Date of Patent: Aug. 31, 1999

[54] LOW TOLERANCE THREADED FASTENER

[76] Inventor: Bernhard M. Janitzki, 51 Poniente 1110 Col. Prados Agua Azul, Puebla, Puebla, 72430, Mexico

[21] Appl. No.: 08/906,229

[22] Filed: Aug. 4, 1997

[51] Int. Cl.⁶ .............................. F16B 39/30; F16B 37/16
[52] U.S. Cl. ....................... 411/310; 411/411; 411/436; 411/938
[58] Field of Search ................................ 411/309, 310, 411/311, 411, 436, 938

[56] References Cited

U.S. PATENT DOCUMENTS

| | | |
|---|---|---|
| 1,369,156 | 2/1921 | Woodward . |
| 2,842,180 | 7/1958 | Brown et al. . |
| 3,459,250 | 8/1969 | Tabor . |
| 3,517,717 | 6/1970 | Orlomoski ........................ 411/311 |
| 3,661,194 | 5/1972 | Macfarlane et al. . |
| 3,721,283 | 3/1973 | Evans . |
| 3,850,215 | 11/1974 | Orlomoski . |
| 3,927,503 | 12/1975 | Wilson . |
| 4,023,914 | 5/1977 | Holmes . |
| 4,071,067 | 1/1978 | Goldby . |
| 4,252,168 | 2/1981 | Capuano ................................ 411/311 |
| 4,396,321 | 8/1983 | Holmes . |
| 4,846,614 | 7/1989 | Steinbock . |
| 5,194,214 | 3/1993 | Snyder et al. . |
| 5,672,037 | 9/1997 | Iwata ....................................... 411/311 |

*Primary Examiner*—Neill Wilson
*Attorney, Agent, or Firm*—Paul M. Denk

[57] ABSTRACT

A threaded fastener is having a raised area or bump on a thread flank. The flank can be positioned on the nut thread or on the bolt thread. The bump forces the mating threads at least on one flank to have near zero tolerances along the pitchline of the threads and thereby eliminating play.

8 Claims, 4 Drawing Sheets

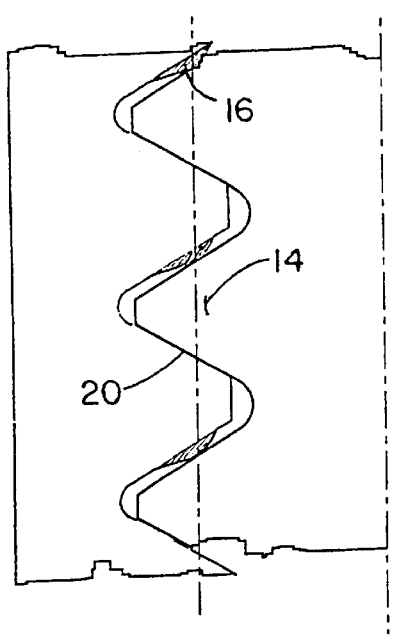
FIG.11
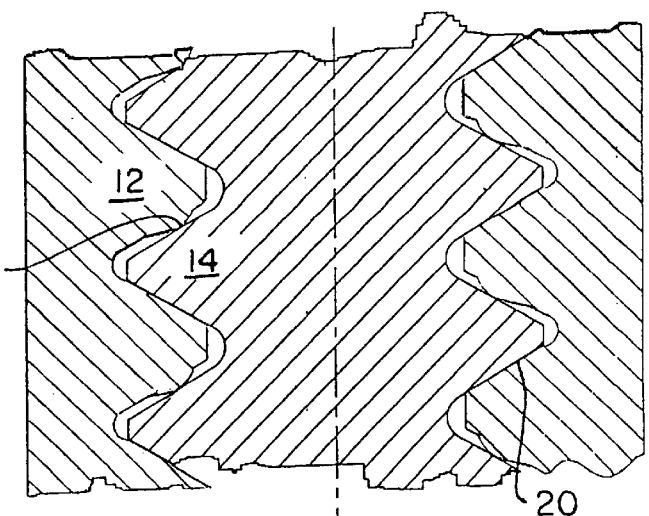
FIG.12
FIG.13
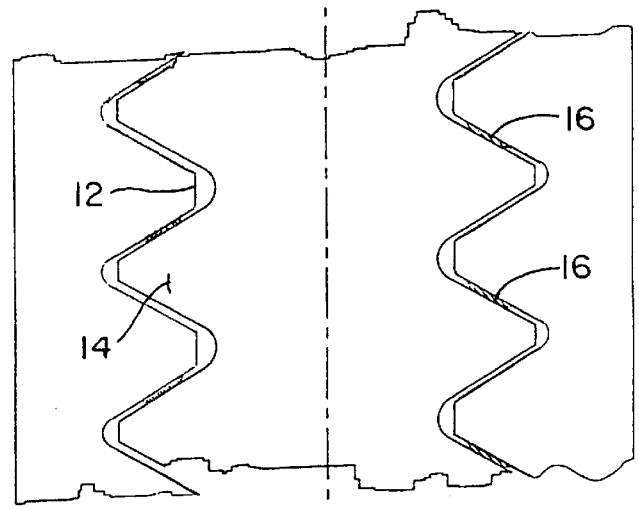
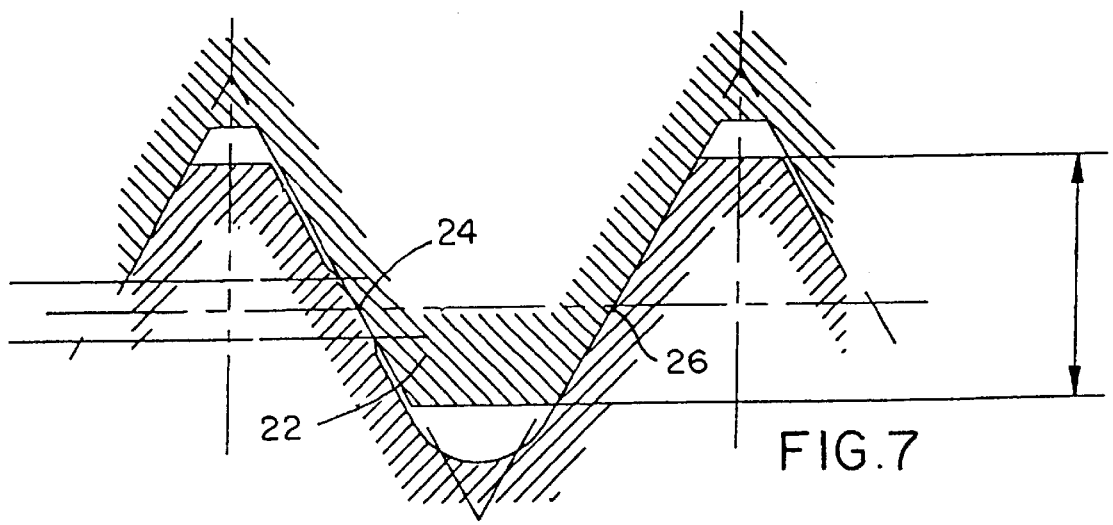
FIG.7

LOW TOLERANCE THREADED FASTENER

BACKGROUND OF THE INVENTION

This invention relates generally to threaded fasteners such as nuts and bolts and more particularly to threaded fasteners having an improved thread and reduced tolerances and improved fastening.

Threaded fasteners are well known to the art. One goal of threaded fasteners, particularly nut and bolt combinations, is to provide such a fastener that stays tightened and does not loosen in use. Generally accepted matching techniques result in tolerances between the nut an bolt threads and there is clearance or play which allows for movement between the elements. For example, a fastener or nut and bolt can loosen under load or vibration.

There are several prior art systems that try to remedy this problem. First, locknuts are used with a nylon washer locked in at the end of the nut. When the nylon washer contacts the bolt, it tightens around the thread and locks the nut in position. Locknuts have disadvantages. The nylon portion of nut has no load carrying threads. Further, it requires more material to make the nut longer and the nylon washer and the nut must be made separately and then crimped together. The locknut of this type can be used only a few times, is not as resistant to heat and requires chemicals i.e. nylon.

Deformed nuts have been used to overcome the loosening problem. These comprise nuts that are deformed out of the circular shape and made into rounded-off triangle shape. Then the bolt engages the threads, it contacts three points and the nut locks around the bolt. However, only heat-treated nuts can be used. To make the deliberate deformation requires an expensive manufacturing set-up. Further, the process is very slow. Also, the reaction of each individual nut is variable, which makes it difficult to predict or guarantee tolerances. Moreover, it can only be used with nuts.

A spiral lock is a lock thread is a commercially available alternative. However, the spiral lock provides an interference on the outside diameter of the bolt. It is difficult to control the interference with accuracy. The surface of the bolt thread can cause galling of the nut and subsequent failure.

Interference-fit threads are used which include a complete interference of the matching parts at the flanks to provide an interference or metal flow. However, based upon accepted machining practices, it is very difficult to produce, for example, class 5 threads (Federal Standard Screw-Thread Standards For Federal Services-Class 5 Interference Fit Screw Threads).

Examples of prior art fastener technologies are disclosed in the following U.S. Pat. No: 1,369,156, to Woodward; No. 2,842,180, to Brown et al; No. 3,459,250 to Tabor; No. 3,661,194, MacFarlane et al.; No. 3,721,283, to Evan; No. 3,850,215, to Orlomoski; No. 3,927,503, to Wilson; No. 4,023,914, Holmes; No. 4,071,067, to Goldby; No. 4,396,321, Holmes; No. 4,846,614, to Steinbock; and No. 5,194,214, to Snyder et al.

It would be advantageous, therefore, to develop a fastener that has close tolerances yet is resistant to loosening or play without the disadvantages of the prior art designs.

SUMMARY OF THE INVENTION

It is among the principal objects of the present invention to provide a threaded fastener that is resistant to loosening.

It is another object of the present invention to provide a threaded fastener that has very close tolerances and is resistant to loosening.

Another object of the present invention to provide a threaded fastener that controls thread contact and tolerances along the thread pitchline.

Another object of the present invention to provide a threaded fastener that controls thread contact and tolerances along the thread pitchline and by controlling width of contact.

Still another object of the present invention is to provide such a threaded fastener that not only controls the pitch diameter of the respective threads to assure correct interference along the thread flank, but also controls the width of contact.

It is still another object of the present invention to provide such a threaded fastener that can be manufactured and produced in a broad range of sizes.

It is yet another object of the present invention to provide such a threaded fastener that is simple and economical to tool, versatile and well suited for its intended purposes.

In accordance with the invention, a threaded fastener is provided having a raised area or bump on the thread flank. The bump forces the mating threads at least on one flank to have near zero tolerances along the pitchline of the threads and thereby eliminating play.

BRIEF DESCRIPTION OF THE DRAWINGS

FIG. 7 is a diagrammatic representation of another embodiment of the novel threaded fastener threads of the present invention with the bump on the external thread of a bolt;

FIG. 11 is another diagrammatic representation of a the embodiment of FIG. 6;

FIG. 12 is another diagrammatic representation of a the embodiment of FIG. 6 illustrating zero play between the nut and bolt; and FIG. 13 is another diagrammatic representation of a the embodiment of FIG. 6 under load.

DESCRIPTION OF THE PREFERRED EMBODIMENT

Figure 1:
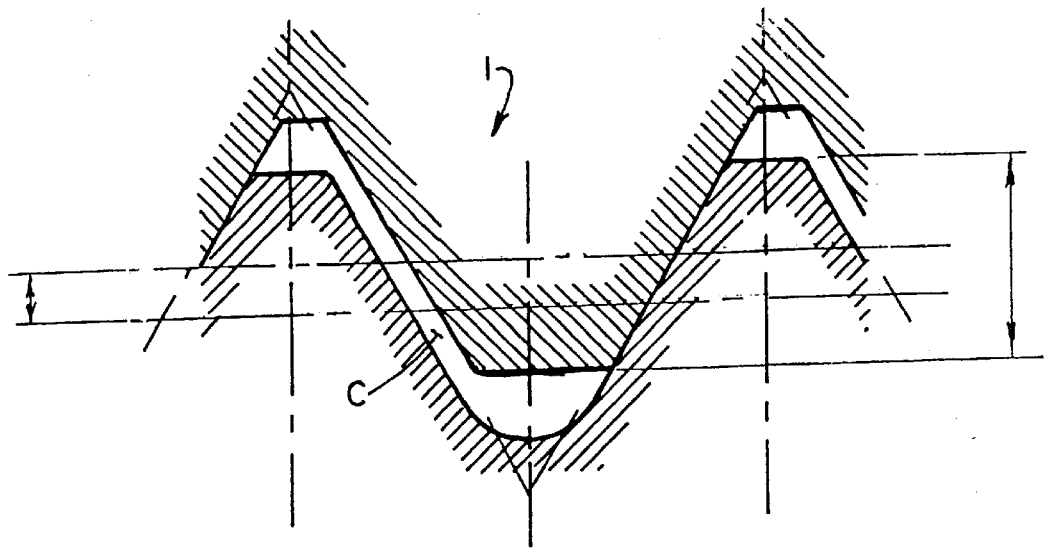
FIG 1 is a diagrammatic representation of engaged standard prior art threaded fastener threads.
Figure 2:
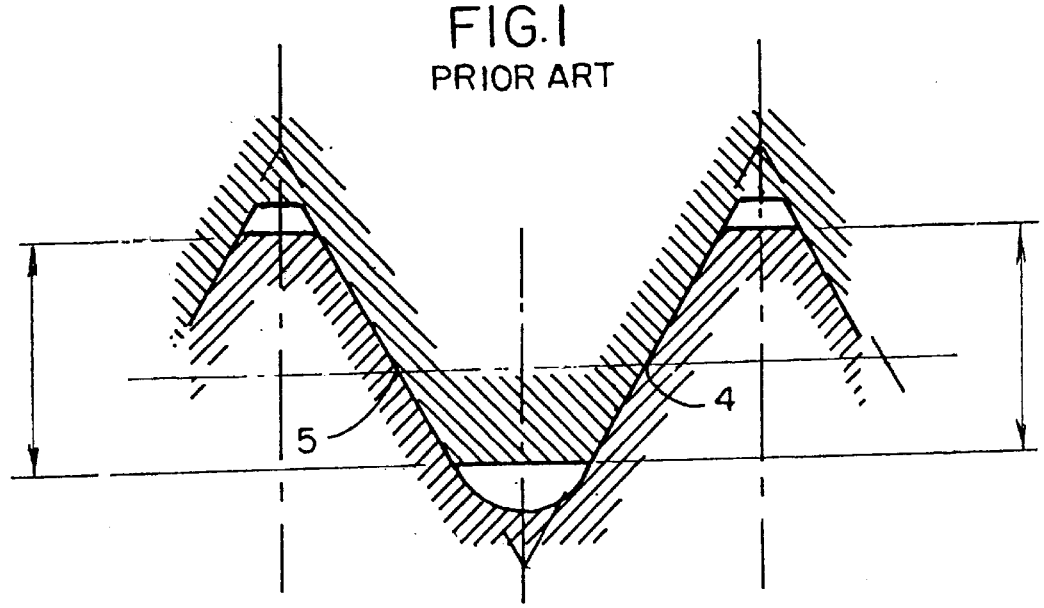
FIG. 2 is a is a diagrammatic representation of a perfect thread.
Figure 9:
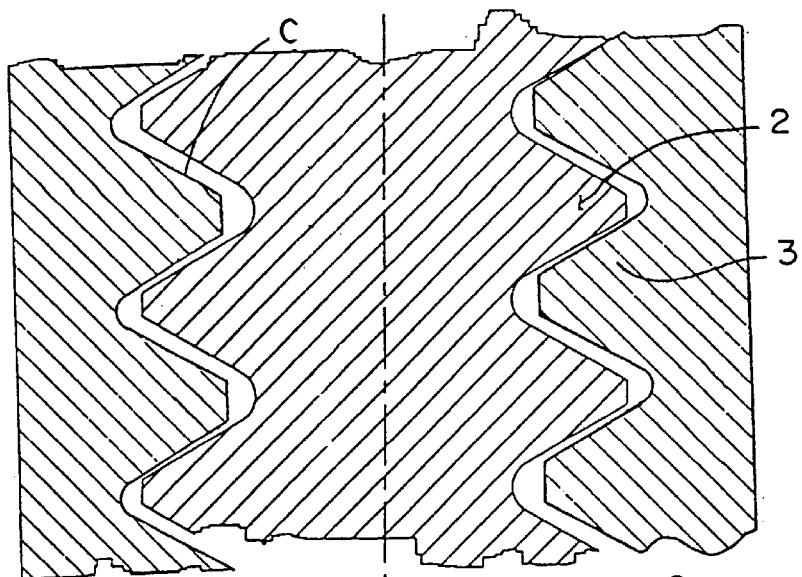
FIG. 9 is another diagrammatic representation of a normal bolt and nut combination under irregular load.
Figure 8:
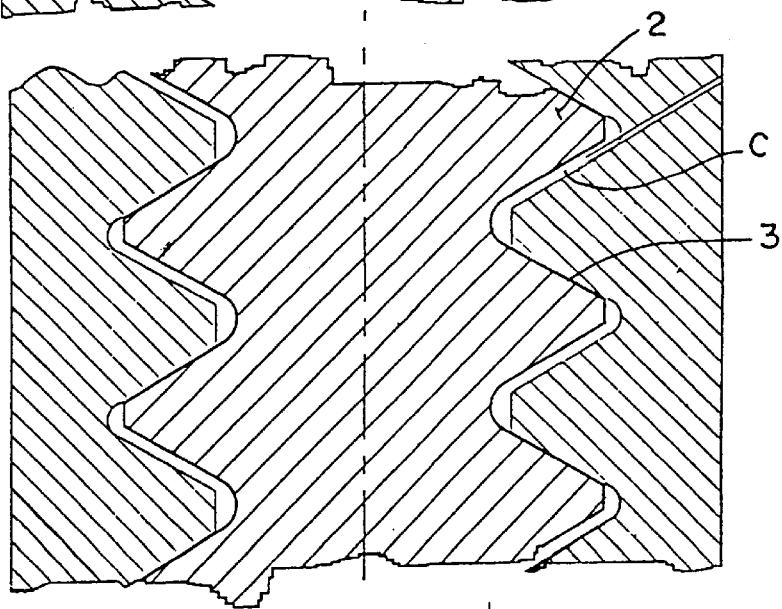
FIG. 8 is another diagrammatic representation of a normal bolt and nut combination under normal load.

FIG. 1 illustrates a standard thread 1 with clearance C. FIG. 8 also illustrates the relationship and play between a normal nut thread 2 and bolt thread 3 As will be appreciated, there are significant clearances C between the respective threads. FIG. 9 illustrates a normal thread under irregular load conditions with significantly increases the clearance C between the nut and bold threads. The amount of clearance is determined by the tolerances set by the manufacturer. FIG. 2, by comparison, is an ideal or perfect thread having full flank contact at points 4 and 5. A perfect thread, however, would require the nut and bolt have identical pitch diameters without clearance.

Figure 3:
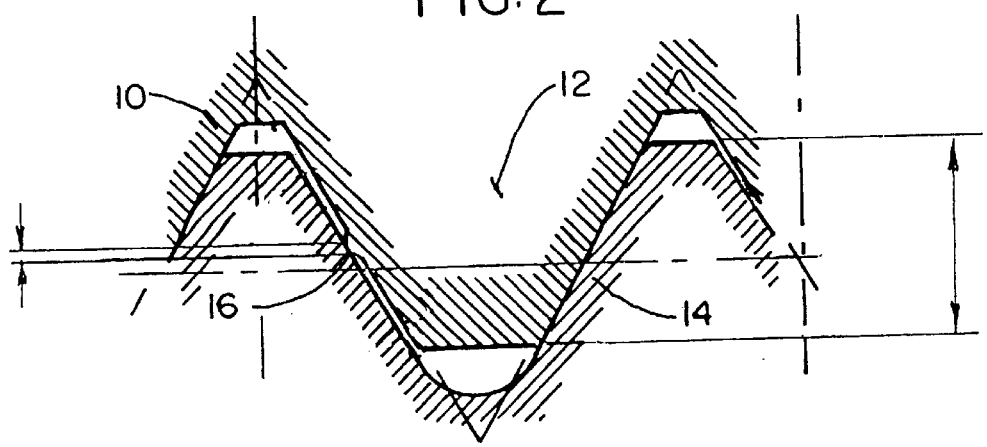
FIG. 3 is a diagrammatic representation of one embodiment of the novel threaded fastener threads of the present invention with the bump on the external threads of the nut.
Figure 4:
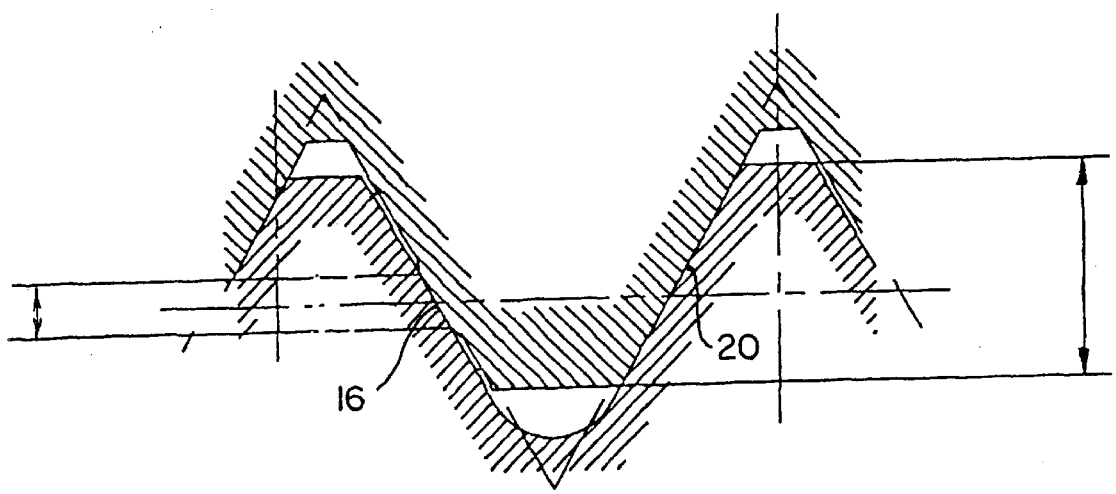
FIG. 4 is a diagrammatic representation of another embodiment of the novel threaded fastener threads of the present invention.
Figure 10:
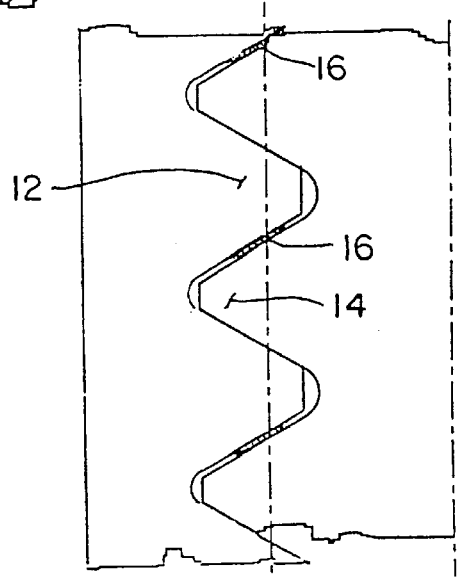
FIG. 10 is another diagrammatic representation of a the embodiment of FIG. 6.

FIG. 3 illustrates one preferred embodiment of the threaded fastener of the present invention, indicated generally by reference numeral 10. The fastener includes a nut thread 12 and a bolt thread 14 As can be seen, the nut thread 12 is tooled with bump 16 on the flank of the thread. As seen in FIGS. 10-13, the bump 16 urges the threads to one side so that there is full flank contact at point 20. The thread, with the bump, are formed by a thread tapping tool. As shown in FIG. 10, the contact area can be varied according to holding torque. The size of the bump 16 can be varied to increase the contact areas on the flanks, as shown in FIG. 4, which has an enlarged or wider bump 16. FIG. 12 illustrates a condition of "zero" play between the thread flanks as a result of the size and positioning of the bump 16. FIG. 13 illustrates the substantial contact between the flanks of the threads due to the positioning and size of bump 16, even under load conditions.

Figure 5:
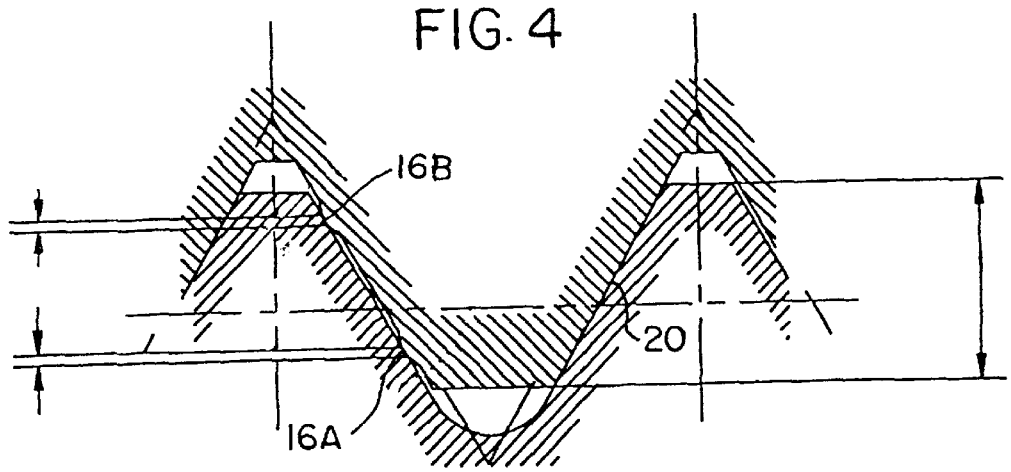
FIG. 5 is a diagrammatic representation of another embodiment of the novel threaded fastener threads of the present invention.

FIG. 5 illustrates another embodiment of the thread of the threaded fastener of the present invention including a pair of spaced apart bumps 16A and 1 8B.

Figure 6:
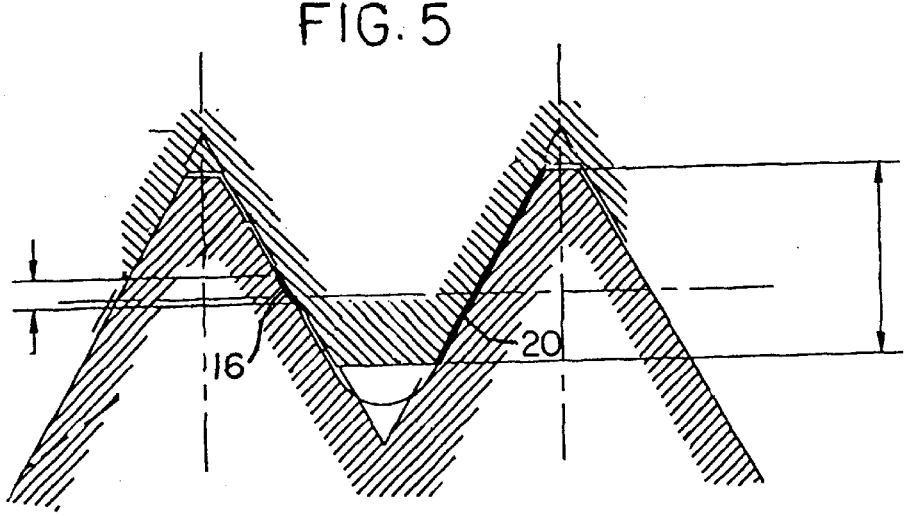
FIG. 6 is a diagrammatic representation of another embodiment of the novel threaded fastener threads of the present invention.

As shown in FIG. 6, the right flank has 100% contact and at the left approximately 15% contact.

The threaded nuts previously described can be formed by using a tape with a complementary indention which will create the desired bump on the thread flank when tooled.

FIG. 7 illustrates another embodiment of the present invention wherein the bolt 22 has a bulge 24 formed on the thread flank. This thread is easily formed on a thread rolling machine with thread rolling dies in a cold forming process. These threads can be formed of a harder material than the nut so that the bump can "bite" into the softer metal. The inclusion of the bump on the bolt thread causes the threaded fastener to function the same way as previously described embodiments, with flush fit on the flanks at point 26.

It will be appreciated from the foregoing that various changes and modifications may be made in the threaded fastener of the present invention without departing from the scope of the appended claims. Therefore the foregoing specification and accompanying drawings are intended to be illustrative only and should not be viewed in a limiting sense.

I claim:

1. A threaded fastener comprising:
   a threaded nut having internal threads;
   a threaded bolt capable of threadedly engaging within said threaded nut having external threads disposed to engage the threads on the inside of the threaded nut, in order to sustain a zero tolerance of looseness during extended usage, said external threads being tooled to include a raised area approximately at the pitch line at the midpoint of the flank portion of said thread, for said threaded bolt, said raised area portion extending approximately perpendicularly from said flank portion, said raised area of the flank portion of said external threads of the bolt disposed to increase and maintain the contact area between the flank portion of the internal threads of the nut and the threads of the bolt so as to decrease and minimize an area of clearance between the respective threads to either side of said bolt raised area when engaged, said raised area being formed of an enlarged area having a widened width for increasing the contact area over a substantial portion of the flank of the formed bolt external threads, said raised area extending from an integral base wherein said base is equal to or greater than the width of said raised contact area, to substantially reduce any clearance between the threaded nut and the threaded bolt when engaged.

2. The threaded fastener of claim 1 wherein said widened raised area on the flank portion of the thread of said threaded bolt being continuous throughout the substantial length of the said bolt thread.

3. The threaded fastener of claim 2 wherein the widened raised area on the flank portion of the external threads of the threaded bolt being formed continuous on the thread rolling machine with thread rolling dyes in a cold forming process.

4. The threaded fastener of claim 2 wherein the raised area upon the external threads for the threaded bolt being formed to provide increase in contact areas between the flank portions of the threads of the threaded bolt and the threaded nut during their engagement.

5. The invention of claim 4 wherein the raised area on the flank portion of the thread of the threaded bolt spreads during the forced engagement of the threaded bolt within the threaded nut during usage.

6. A threaded fastener comprising:
   a threaded nut having internal threads;
   a threaded bolt having external threads;
   at least one of said threaded surfaces being tooled to include a raised area on a flank portion of said thread, said raised area disposed to increase the contact area between the raised area disposed on one of said threads with the flank portion of the other threaded surface, so as to decrease an area of clearance between the last recited respective threads; and
   wherein the raised area on the flank portion of the threaded surface formed of a harder material than the flank portion of the other threaded surface so as to cause said raised area of the threaded surface to continuously bite into the softer metal forming the flank portion of the other threaded surface.

7. A threaded fastener comprising:
   a threaded bolt having external threads;
   a threaded nut capable of threadedly engaging upon said threaded bolt and having internal threads disposed to engage the threads on the outside of the threaded bolt in order to sustain a zero tolerance of looseness during extended usage, said internal threads being tooled to include a raised area approximately at the pitch line and at the midpoint of the flank portion of said threads for said threaded nut, said raised area portion extending substantially perpendicularly from said thread flank portion, said raised area of the flank portion disposed to increase and maintain the contact area between the flank portion of the external threads of the bolt and the raised area of the internal threads of the nut so as to decrease and minimize any area of clearance between the respective threads to either side of said nut raised area when engaged, said raised area being formed of an enlarged area having a widened width for increasing the contact area over a substantial portion of the flank of the formed nut internal threads, said raised area extending from an integral base wherein said base is equal to or greater than the width of said raised contact area, and to substantially reduce any clearance between the threaded nut and the threaded bolt when engaged.

8. The threaded fastener of claim 7 where in said widened raised area on the flank portion of the thread of the threaded nut being continuous approximately throughout the length of the nut thread.

* * * * *